United States Patent [19]

Williams

[11] Patent Number: 5,108,788
[45] Date of Patent: Apr. 28, 1992

[54] METHOD FOR TREATING INORGANIC FIBER INSULATION TO MINIMIZE DUST AND AIRBORNE PARTICULATES OR TO ACCOMPLISH WATERPROOFING

[75] Inventor: Thomas H. Williams, Fall Branch, Tenn.

[73] Assignee: Eastman Kodak Company, Rochester, N.Y.

[21] Appl. No.: 580,409

[22] Filed: Sep. 10, 1990

[51] Int. Cl.$^5$ .................... B05D 3/02; B05D 3/12
[52] U.S. Cl. .................... 427/154; 427/358; 427/389.8; 427/407.3; 427/421; 428/443
[58] Field of Search .............. 427/154, 214, 389.8, 427/393.6, 407.3, 421, 356, 358; 428/443, 392, 395

[56] References Cited

U.S. PATENT DOCUMENTS

| | | | |
|---|---|---|---|
| 3,940,545 | 2/1976 | Williams | 428/392 |
| 4,347,150 | 8/1982 | Arpin | 252/135 |
| 4,369,203 | 1/1983 | Hansen | 427/10 |
| 4,380,595 | 4/1983 | Arpin | 524/5 |
| 4,383,451 | 5/1983 | Chapel | 73/864 |
| 4,594,268 | 6/1986 | Kirwin | 427/136 |
| 4,632,847 | 12/1986 | Lomasney et al. | 427/154 |
| 4,693,755 | 9/1987 | Erzinger | 134/4 |
| 4,699,666 | 10/1987 | Tidquist et al. | 134/4 |
| 4,828,883 | 5/1989 | Ramun | 427/214 |
| 4,966,791 | 10/1990 | Kissell et al. | 427/392 |

*Primary Examiner*—Michael Lusignan
*Assistant Examiner*—Diana L. Dudash
*Attorney, Agent, or Firm*—J. Frederick Thomsen; William P. Heath, Jr.

[57] ABSTRACT

A method for treating fiber insulation to minimize the formation of dust and airborne particulate and waterproofing calcium silicate by applying to the insulation an aqueous composition containing certain water-dispersible polymers. The method is especially useful when used in conjunction with the removal of installed insulation.

20 Claims, No Drawings

METHOD FOR TREATING INORGANIC FIBER INSULATION TO MINIMIZE DUST AND AIRBORNE PARTICULATES OR TO ACCOMPLISH WATERPROOFING

FIELD OF THE INVENTION

This invention relates to a method for controlling dust from inorganic fibers and foams. More specifically, the invention is directed to the treatment of fibrous batting such as mineral wool or fiberglass batting to minimize airborne particulates which occur when the batting is handled, moved, or removed from its installation location and for waterproofing calcium silicate.

DISCUSSION OF THE BACKGROUND

Fiber batting insulation is well known in the construction industry and is generally installed in floors, ceilings and walls. In addition to insulation in the form of batting, fiber insulation can be installed by blowing fiber insulation into an enclosed or open wall, ceiling or floor space. When the fiber insulation is handled or installed, the fibers break causing fiber dust and particulate to be suspended in the air. These suspended particles cause physical discomfort to persons handling the fiber insulation or breathing air containing the suspended particulate.

In the construction of buildings, fiber insulation such as calcium silicate is commonly used for pipe insulation. However, after application to pipes, an additional waterproof insulation must generally be provided over the calcium silicate insulation to render the insulation waterproof. For example, it is well known to mix calcium silicate with water and apply this mixture to pipes. Following application of the calcium silicate slurry to the pipe, a thick paste of polyvinyl acetate may be brushed onto the calcium silicate. The calcium silicate provides insulation values whereas the dried polyvinyl acetate provides protection from water. Application of waterproofing materials in this manner has the disadvantage that it is very time consuming.

Russian patent 1,198,033 discloses mineral wool thermal and acoustic insulation. The mineral wool is coated with an emulsion containing mineral oil and high molecular weight organic acids such as naphthenic acid in concentrated aqueous alkali solution. This procedure minimizes dust and is simple and inexpensive.

Russian patent 2,981,280 discloses applying a resin binder to a molded mineral wool surface and heat-treating the mineral wool to eliminate dusting and sharp edges.

Japanese 77/131797 discloses using granular calcium silicate hydrate and a binder including gypsum, cement, polyvinyl acetate and acrylic resin to form a paint film. The paint film has an external appearance similar to that of natural earth and sand, has excellent whiteness and can be used for finishing interior walls, exterior walls or the ceilings of buildings.

U.S. Pat. No. 4,380,595 discloses a penetrating sealant which gives rapid and deep penetration into the matrix of an insulating material to improve matrix adhesion and the cohesive strength of the insulating material. The sealant composition is based on an aqueous alkali silicate, a cationic or nonionic surfactant and an acrylate polymer.

Despite known methods for addressing the problem of dust and particulate formation when handling and installing fibrous insulation materials, a need continues to exist for a method of limiting dust and particulate formation, thereby improving the safety and handling of fiber insulation materials. A need also exists for improved waterproofing compositions which can be applied to fiber insulation materials.

SUMMARY OF THE INVENTION

Accordingly, one object of the present invention is to provide a convenient method for treating fiber insulation, particularly fiber insulation batting to minimize airborne dust and particulates of the fiber insulation material. A further object is to provide a method of waterproofing the fibrous insulation.

These and other objects which will become apparent from the following specification have been achieved by the present method of treating fiber insulation with an aqueous solution of a water-dispersible polyester. The polyesters disperse in water and can be conveniently applied by conventional coating or spraying. When dry, the polyester substantially minimizes dusting and formation of airborne fiber particulates and, additionally, waterproofs the fiber insulation.

The invention is also directed to fiber insulation having a coating of the water dispersible polyester.

DETAILED DESCRIPTION OF THE PREFERRED EMBODIMENTS

The water-dispersible polymers useful in the present invention are described in U.S. Pat. Nos. 3,734,874, 3,779,993, 4,233,196 and 4,335,220, the disclosures of which are incorporated herein by reference. These polymers are, for the most part, water-dispersible because they form electrostatically-stabilized colloids when mixed with water. The colloid particle size varies with the polymer composition but has been shown by light diffraction studies and transmission electron microscopy (on fresh films) to be mostly 200–800 Å in diameter. The aqueous colloid dispersions exhibit a minimum precipitation of solid material with time, in the temperature range of 0.1°–99.9° C. because the relationship between the particle densities and viscosities (very similar to those of water when concentrations are less than 30 weight percent) are such that thermal energy expressed as Brownian motion is sufficient to keep the particles suspended in water.

The water-dispersible polymers have an inherent viscosity of at least 0.1 dL/g, preferably about 0.28–0.38 dL/g, when determined at 25° C. using 0.25 g polymer per 100 ml of a solvent consisting of 60 parts by weight phenol and 40 parts by weight tetrachloroethane.

The polymers are comprised of:
(i) monomer residues of at least one dicarboxylic acid;
(ii) about 4 to 25 mole percent, based on the total of all acid, hydroxy and amino equivalents, of monomer residues of at least one difunctional sulfo monomer containing at least one sulfonate group bonded to an aromatic ring where the functional groups are hydroxy, carboxyl or amino;
(iii) monomer residues of at least one diol or a mixture of a diol and a diamine comprising:
 (a) at least 15 mole percent, based on the total mole percent of diol monomer residues or diol and diamine monomer residues, of a diol having the formula $-(OCH_2CH_2)_n-$ where n is 2 to about 20, or
 (b) about 0.1 to less than about 15 mole percent, based on the total mole percent of diol monomer residues or diol and diamine monomer residues, of monomer residues of a poly(ethylene glycol) having the formula $-(OCH_2CH_2)_n-$ where n is 2 to about 500, provided that the mole percent of such residues is inversely proportional to the value of n; and optionally, (iv) monomer residues of at least one difunctional monomer reactant selected from hydroxycarboxylic acids, aminocarboxylic acids and aminoalkanols;

provided that at least 20 percent of the groups linking the monomeric units are ester, i.e., carbonyloxy, linkages.

The water-dispersible polymers thus comprise polyesters and polyesteramides consisting of repeating, alternating residues of (1) one or more dicarboxylic acids and (2) one or more diols or a combination of one or more diols and one or more diamines where, in the preceding definition, the mole percentages are based on 10 mole percent dicarboxylic acid residues and 100 mole percent diol or diol and diamine residues. Alternatively, the polymers may include residues of monomers having mixed functionality such as hydroxycarboxylic acids, aminocarboxylic acids and/or aminoalkanols.

The residues of component (i) may be derived from one or more dicarboxylic acids or their ester-forming derivatives such as dialkyl esters, bis(hydroxyalkyl) esters, acid chlorides or, in some cases, anhydrides. The sulfonate group of component (ii) may be an alkali metal sulfonic salt such as lithium, potassium or, preferably, sodium sulfonate groups.

The concentration of the above-described polymeric material in the aqueous compositions may be varied depending on several factors such as the particular polymer used, the equipment from which the composition will be applied, the nature and position of the fiber material to be treated, etc. Normally, the concentration of the water-dispersible polymer will be at least 5 weight percent based on the total weight of the aqueous composition with concentrations in the range of about 10 to 40 weight percent being more common. The aqueous compositions may contain other compounds to promote the drying, penetration and/or visualization. Examples of such compounds include alcohols such as ethanol, propanol and 2-propanol; conventional surface-active agents; and colorants such as Color Index Pigment Yellow 1, 3, 4, 5, 10, 12, 13, 14, 15, 16, 17, 55, 60, 73, 74, 75 and 83 as well as C.I. Pigment Orange 1, 14 and 15. While not preferred, the aqueous compositions also may contain minor amounts, e.g., up to about 5 weight percent, of another compatible polymeric material.

The preferred water-dispersible polymer is a polyester having an inherent viscosity of about 0.28 to 0.38 dL/g comprised of:

(i) diacid monomer residues comprising about 75 to 84 mole percent isophthalic acid monomer residues and about 16 to 25 mole percent 5-sodiosulfoisophthalic acid monomer residues; and (ii) diol monomer residues comprising about 45 to 60 mole percent diethylene glycol monomer residues and about 40 to 55 mole percent ethylene glycol, 1,4-cyclohexanedimethanol monomer residues or mixtures thereof.

Specific embodiments of these water-dispersible polymers are available from Eastman Chemical Products, Inc. in the form of pellets (EASTMAN AQ 29S Polymer, EASTMAN 38S Polymer and EASTMAN 55S Polymer) and in the form of aqueous dispersions (EASTMAN AQ 29D Polymer, EASTMAN 38D Polymer and EASTMAN 55D Polymer). These polyesters have been shown to disperse in water due to the presence of 5-sodiosulphonyl isophthalic acid residues.

The aqueous compositions may be applied to fiber insulation by any conventional coating means using a brush, sprayer, roller and similar equipment. The most suitable means for applying the compositions depends on the position and location of the fiber insulation to be treated. The sprayability of the above-described aqueous compositions is an especially advantageous feature of the invention since it permits application of the aqueous compositions over a shorter period of time with less labor costs. The sprayability of the compositions also permits their application to fiber insulation present at relatively inaccessible points or locations. After the aqueous composition has been applied and permitted to partially or completely dry, the treated insulation may be removed by conventional methods, i.e., by mechanical denuding. In some cases, as the insulation is removed, for example from a pipe, additional spraying of the inside area of the insulation as it becomes exposed, with the aqueous composition can minimize further the formation of dust and airborne particulate.

The fiber insulation which may be treated by the method of the present invention includes any inorganic fiber insulation or foam. The fiber insulation may be in the form of batting or as insulation coated on objects by spraying or other means. The method of the present invention is particularly useful for waterproofing fiber insulation which has been previously applied to walls, ceilings, pipes, etc., whether the insulation is in the form of batting or has been applied by spraying, brushing, trowelling or other means. A preferred embodiment of the present method is the application of the polyester dispersion to fiberglass batting, for example, in floors, ceilings and walls. Other non-limiting examples of inorganic fiber insulation materials which may be used in the present invention include mineral wool, calcium silicate, foam glass, etc., although the present invention is not limited to the specific examples and may be used with any inorganic fiber or foam insulation material.

The method provided by this invention may be utilized in conjunction with the removal of insulation as described or it may be used to render insulation waterproof, when the insulation is not to be removed immediately. When the aqueous composition is applied and allowed to dry, the water-dispersible polymer forms a film or coating which binds the friable insulation fibers, thereby minimizing the release of dust and particulate. When the aqueous composition is applied in conjunction with insulation removal, the composition typically is applied in an amount which is sufficient to achieve a penetration of about 1.8 inches. The amount of aqueous composition required for a given area of insulation will vary considerably depending upon a number of factors such as the type, condition, permeability and thickness of the insulation, the concentration of the water-dispersible polymer in the aqueous composition, etc. Maximum penetration may require a plurality of applications of the aqueous composition with the second coating (and any subsequent coatings) being applied before the previous coat is allowed to dry. When the aqueous compositions are applied to insulation which is to be allowed to remain in place for some period of time (commonly referred to as encapsulation), the depth to which the composition penetrates the insulation typically is in the range of about 0.5 to 0.8 inches.

Other features of the invention will become apparent in the course of the following descriptions of exemplary embodiments which are given for illustration of the invention and are not intended to the limiting thereof.

EXAMPLES

EXAMPLE 1

An aqueous composition (100 ml) comprising EASTMAN AQ 29D dispersed polymer (30 weight percent in water) and 1.5 weight percent C.I. Pigment Yellow-14 was sprayed on a 12 inch by 3 inch section of fiberglass using a Chromist ™ laboratory spray unit. The aqueous composition was allowed to dry about 10 minutes. The aqueous polyester composition absorbed into the fiberglass approximately ⅛ to ¼ inch. The coated fiberglass fibers could be handled and bent without losing glass fibers. In contrast, handling and bending of untreated sections of fiberglass resulted in formation of airborne glass dust and fibers.

EXAMPLE 2

An aqueous composition (two-thirds gallon) of the aqueous composition of Example 1 was sprayed on an 8-inch pipe which was covered with two inches of calcium silicate insulation and a ¼ inch mud mixture of calcium silicate. Two coats of the aqueous composition were applied using a garden sprayer. Approximately 10 minutes drying time was allowed between coatings. After drying 10-15 minutes, the final coating was dry to the touch giving a tough pliable coating which absorbed into the calcium silicate ⅛ to ¼ inch.

The coated pipe was exposed to ambient weather conditions for 12 months. After 12 months the coating remained intact and the calcium silicate was fully protected. These results are comparable to results obtained with a conventional vinyl acetate coating which is considerably more difficult and time consuming to apply than the aqueous composition of the present invention.

EXAMPLE 3

One gallon of the aqueous composition of Example 1 was sprayed on a 30 inch by 30 inch by 2 inch section of mineral wool using a garden sprayer. One coating of the aqueous composition was applied. The dispersed polymer absorbed completely in some areas of the mineral wool and absorbed through one inch in other areas. After drying 20-25 minutes, the coating was dry to the touch. The dry coated mineral wool could be bent without loss of fibers or mineral wool dust.

Obviously, numerous modifications and variations of the present invention are possible in light of the above teachings. It is therefore to be understood that within the scope of the appended claims, the invention may be practiced otherwise than as specifically described herein.

We claim:

1. A method for treating inorganic fiber insulation to minimize dust and airborne particulate or to accomplish waterproofing, comprising the steps of: applying to said insulation an effective amount of a composition comprising water and a water-dispersible polymer having an inherent viscosity of at least 0.1 dL/g, determined at 25° C. using 0.25 g polymer per 100 ml of a solvent consisting of 60 parts by weight phenol and 40 parts by weight tetrachloroethane, wherein said polymer comprises:
   (i) monomer residues of at least one dicarboxylic acid;
   (ii) about 4 to 25 mole percent, based on the total of all acid, hydroxy and amino equivalents, of monomer residues of at least one difunctional sulfo monomer containing at least one sulfonate group bonded to an aromatic ring wherein the functional groups are hydroxy, carboxyl or amino;
   (iii) monomer residues of at least one diol or a mixture of a diol and a diamine comprising:
     (a) at least 15 mole percent, based on the total mole percent of diol monomer residues or diol and diamine monomer residues, of a diol having the formula $-(OCH_2CH_2)_n-$ wherein n is 2 to about 20, or
     (b) about 0.1 to less than about 15 mole percent, based on the total mole percent of diol monomer residues or diol and diamine monomer residues, of poly(ethylene glycol) monomer residues having the formula $-(OCH_2CH_2)_n-$ wherein n is 2 to about 500, wherein the mole percent of said monomer residues (a) or (b) is inversely proportional to the value of n;

provided that at least 20% of the groups linking the monomeric units are ester linkages.

2. The method of claim 1, wherein said polymer further comprises:
   (iv) monomer residues of at least 1 difunctional monomer reactant selected from the group consisting of hydroxycarboxylic acids, aminocarboxylic acids and aminoalkanols.

3. The method of claim 1, wherein said composition comprises about 10 to 40 weight percent, based on the total weight of the composition, of said water-dispersible polymer.

4. The method of claim 3, wherein said composition further comprises a colorant.

5. The method of claim 3, wherein said water-dispersible polymer has an inherent viscosity of about 0.28 to 0.38 dL/g and is comprised of:
   (i) diacid monomer residues comprising about 75 to 84 mole percent isophthalic acid monomer residues and about 16 to 25 mole percent 5-sodiosulfoisophthalic acid monomer residues; and
   (ii) diol monomer residues comprising about 45 to 60 mole percent diethylene glycol monomer residues and about 40 to 55 mole percent ethylene glycol, 1,4-cyclohexanedimethanol monomer residues or mixtures thereof.

6. The method of claim 5, wherein said composition further comprises a colorant.

7. The method of claim 1, wherein said applying step is conducted by spraying.

8. A method for removing inorganic fiber insulation while minimizing the formation of airborne insulation dust and particulate, comprising the steps of:
   (A) applying to said insulation an effective amount of the composition comprising water and a water-dispersible polymer having an inherent viscosity of at least 0.1 dL/g, determined at 25° C. using 0.25 g polymer per 100 ml of a solvent consisting of 60 parts by weight phenol and 40 parts by weight tetrachloroethane, said polymer comprising:
     (i) monomer residues of at least one dicarboxylic acid;
     (ii) about 4 to 25 mole percent, based on the total of all acid, hydroxy and amino equivalents, of monomer residues of at least one difunctional sulfo monomer containing at least one sulfonate group bonded to an aromatic ring wherein the functional groups are hydroxy, carboxyl or amino;

(iii) monomer residues of at least one diol or a mixture of a diol and a diamine comprising:

(a) at least 15 mole percent, based on the total mole percent of diol monomer residues or diol and diamine monomer residues, of a diol having the formula —$(OCH_2CH_2)_n$— wherein n is 2 to about 20, or (b) about 0.1 to less than about 15 mole percent, based on the total mole percent of diol monomer residues or diol and diamine monomer residues, of poly(ethylene glycol) monomer residues having the formula —$(OCH_2CH_2)_n$— wherein n is 2 to about 500, wherein the mole percent of said monomer residues (a) or (b) is inversely proportional to the value of n; provided that at least 20% or the groups linking the monomeric units are ester linkages, and (B) removing said treated insulation.

9. The method of claim 8, wherein said polymer further comprises;

(iv) monomer residues of at least one difunctional monomer reactant selected from the group consisting of hydroxycarboxylic acids, aminocarboxylic acids and aminoalkanols.

10. The method of claim 8, wherein said composition comprises about 10 to 40 weight percent, based on the total weight of said composition, of said water-dispersible polymer.

11. The method of claim 10, wherein said composition further comprises a colorant.

12. The method of claim 11, wherein said colorant is yellow.

13. The method of claim 8, wherein said water-dispersible polymer has an inherent viscosity of about 0.28–0.38 dL/g and is comprised of:

(i) monomer diacid residues comprising about 75–84 mole % isophthalic acid monomer residues and about 16–25 mole % 5-sodiosulfoisophthalic acid monomer residues, and (ii) diol monomer residues comprising about 45–60 mole % diethylene glycol monomer residues and about 40–55 mole % ethylene glycol, 1,4-cyclohexanedimethanol monomer residues or mixtures thereof.

14. The method of claim 13, wherein said applied composition is dried and said treated insulation is mechanically removed.

15. The method of claim 8, wherein said applying step is conducted by spraying.

16. The polymer coated fiber insulation obtained by the method of claim 1.

17. The polymer coated fiber insulation obtained by the method of claim 5.

18. A method for removing inorganic fiber insulation while minimizing the formation of airborn insulation dust and particulate, comprising the steps of:

(A) applying to said insulation an effective amount of the composition comprising water and a water-dispersible polymer having an inherent viscosity of 0.28 to 0.38 dL/g, determined at 25° C. using 0.25 g polymer per 100 ml of a solvent consisting of 60 parts by weight phenol and 40 parts by weight tetrachloroethane, said polymer comprising:

(i) monomer diacid residues comprising about 75–84 mole % isophthalic acid monomer residues and about 16–25 mole % 5-sodiosulfoisophthalic acid monomer residues, and (ii) diol monomer residues comprising about 45–60 mole % diethylene glycol monomer residues and about 40–55 mole % ethylene glycol, 1,4-cyclohexanedimethanol monomer residues or mixtures thereof;

B. drying said treated composition; and

C. mechanically removing said treated composition.

19. A method for water proofing inorganic fiber insulation comprising the steps of:

(A) applying to said insulation an effective amount of a composition comprising water and a water-dispersible polymer having an inherent viscosity of at least 0.1 dL/g, determined at 25° C. using 0.25 g polymer per 100 ml of a solvent consisting of 60 parts by weight phenol and 40 parts by weight tetrachloroethane, wherein said polymer comprises:

(i) monomer residues of at least one dicarboxylic acid;

(ii) about 4 to 25 mole percent, based on the total of all acid, hydroxy and amino equivalents, of monomer residues of at least one difunctional sulfo monomer containing at least one sulfonate group bonded to an aromatic ring wherein the functional groups are hydroxy, carboxyl or amino;

(iii) monomer residues of at least one diol or a mixture of a diol and a diamine comprising:

(a) at least 15 mole percent, based on the total mole percent of diol monomer residues or diol and diamine monomer residues, of a diol having the formula —$(OCH_2CH_2)_n$— wherein n is 2 to about 20, or (b) about 0.1 to less than about 15 mole percent, based on the total mole percent of diol monomer residues or diol and diamine monomer residues, of poly(ethylene glycol) monomer residues having the formula —$(OCH_2CH_2)_n$— wherein n is 2 to about 500, wherein the mole percent of said monomer residues (a) or (b) is inversely proportional to the value of n;

provided that at least 20% of the groups linking the monomeric units are ester linkages; and B. allowing the treated composition of step (A) to dry.

20. The method of claim 19, wherein said water-dispersible polymer has an inherent viscosity of about 0.28 to 0.38 dL/g and is comprised of:

(i) diacid monomer residues comprising about 75 to 84 mole percent isophthalic acid monomer residues and about 16 to 25 mole percent 5-sodiosulfoisophthalic acid monomer residues; and (ii) diol monomer residues comprising about 45 to 60 mole percent diethylene glycol monomer residues and about 40 to 55 mole percent ethylene glycol, 1,4-cyclohexanedimethanol monomer residues or mixtures thereof.

* * * * *